(12) United States Patent  
Hines

(10) Patent No.: US 7,478,628 B2
(45) Date of Patent: Jan. 20, 2009

(54) VAPOR AND LIQUID FUEL INJECTION SYSTEM

(76) Inventor: James F. Hines, 1610 Country Road 603, New Brockton, AL (US) 36351

(*) Notice: Subject to any disclaimer, the term of this patent is extended or adjusted under 35 U.S.C. 154(b) by 325 days.

(21) Appl. No.: 11/516,163

(22) Filed: Sep. 6, 2006

(65) Prior Publication Data
US 2008/0053416 A1 Mar. 6, 2008

(51) Int. Cl.
*F02M 31/00* (2006.01)
(52) U.S. Cl. ...................................... 123/557
(58) Field of Classification Search .............. 123/557, 123/523, 545, 552, 558; 137/334, 376; 239/136
See application file for complete search history.

(56) References Cited

U.S. PATENT DOCUMENTS

| | | | |
|---|---|---|---|
| 4,398,523 A * | 8/1983 | Henson | 123/557 |
| 4,480,622 A | 11/1984 | Hoffman | |
| 4,515,135 A | 5/1985 | Glass | |
| 4,883,616 A | 11/1989 | Covey | |
| 5,291,870 A | 3/1994 | Covey | |
| 5,327,874 A | 7/1994 | Pugachev et al. | |
| 5,408,973 A * | 4/1995 | Spangjer | 123/478 |
| 5,596,973 A | 1/1997 | Grice | |
| 6,186,126 B1 | 2/2001 | Gray | |
| 6,189,516 B1 * | 2/2001 | Hei Ma | 123/524 |
| 6,557,535 B2 | 5/2003 | Stone | |
| 6,758,194 B2 * | 7/2004 | Shetley et al. | 123/557 |
| 6,868,839 B2 | 3/2005 | Chu | |
| 2006/0037589 A1 | 2/2006 | Gupta et al. | |

FOREIGN PATENT DOCUMENTS

GB 2312923 12/1997

* cited by examiner

*Primary Examiner*—M. McMahon
(74) *Attorney, Agent, or Firm*—Gene Scott; Patent Law & Venture Group

(57) ABSTRACT

A fuel delivery system and method in an internal combustion engine including directing fuel in thermal contact with an exhaust system of the engine to vaporize the fuel, using liquid fuel when vaporized fuel is not available, and controlling the temperature of the vaporized fuel by mixing vapor and liquid.

3 Claims, 1 Drawing Sheet

VAPOR AND LIQUID FUEL INJECTION SYSTEM

CROSS-REFERENCE TO RELATED APPLICATIONS

Not applicable

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to internal combustion engine fuel delivery systems and methods. More specifically, this invention relates to a system and method for providing a more efficient use of gasoline for operating an internal combustion engine by vaporizing fuel prior to injection into engine cylinders.

2. Description of Related Art Including Information Disclosed Under 37 CFR 1.97 and 1.98

Grice, U.S. Pat. No. 5,596,973 discloses a fuel expander which is placed in-line in a fuel supply system for an engine that has a heat exchange means, which receives heat from an engine component, such as a radiator hose, and transfers the heat to the fuel supply system prior to the fuel reaching the engine. The fuel expander has a mesh screen near the entrance to the fuel expander. Auxiliary heating means may be used with the device.

Gray, U.S. Pat. No. 6,186,126 discloses an automotive power plant that includes an internal combustion engine and a heat exchanger for vaporizing fuel to the internal combustion engine utilizing heat from the combustion exhaust gas. The vaporized fuel may be fed to a combustion cylinder containing the compressed gas produced by a compression stroke. Alternatively, the vaporized gas may be fed to a dedicated expander for extracting work therefrom and then fed to the internal combustion engine.

Covey, U.S. Pat. No. 4,883,616 discloses a vaporizer unit having an enclosed casing including a plurality of tubes therein, defining a fuel passage therethrough, including the tubes. The tubes have coiled wire screen therein. An auxiliary carburetor is positioned at the inlet end of the fuel passage, and an outlet passage leads to the main carburetor of the automobile. The casing also defines an exhaust passage therethrough, transversely of the fuel passage, providing heat transfer between the exhaust gases and the tubes. The temperature of the resulting vaporized fuel is sensed for varying the flow of the exhaust gases and thereby controlling the temperature of the vaporized fuel, which is maintained between 250 and 260 degrees C. An electric crystal is used for breaking down the heavy ends of the fuel. The rate of flow of air to the main carburetor is varied for correspondingly varying the rate of intake of vaporized fuel from the vaporizer unit. Automatic and manual controls are both utilized selectively, each without interfering with the other.

Hoffman, U.S. Pat. No. 4,480,622 discloses a fuel vaporizer for an internal combustion engine comprising an elongate vaporizer chamber having one end connected to a source of air and atomized liquid fuel, and the other end connected with a throttle valve for controlling a flow of vaporized fuel to the cylinders of an engine. A passage extends longitudinally of the chamber for flow of hot exhaust gasses in heat exchange relationship with the air and atomized fuel mixture to vaporize the fuel to a heated, dry vaporous state. The atomized fuel and air mixture flows through a plurality of passages extending through a body of material having high thermal conductivity.

Tsoi-Hei Ma, GB 2312923 discloses a heat exchanger arranged upstream of fuel injectors, for transferring heat from a heating fluid to the fuel that is to be injected, the temperature of the fluid is constantly maintained at a value not exceeding the boiling point of the fuel at the prevailing pressure of the fuel in the heat exchanger. The fluid may be a liquid that is heated electrically and the fluid circuit may include an insulated reservoir. The fluid may be exhaust gases or engine coolant from two sources at temperatures above and the below the temperature to be maintained. A valve may control the flows from the two sources in response to a thermostat in the mixed flows. The heating temperature may be up to 50 degrees Celsius for port injection, 50 to 100 degrees Celsius for direct fuel injection and 200 to 260 degrees Celsius for diesel injection.

Gupta et al., US 2006/0037589 discloses an internal combustion engine fuel system having a membrane separator for separating a primary fuel into a high octane fuel and a low octane fuel, and wherein the primary fuel is heated for separation in the membrane separator. A heat pipe having an evaporator section is positioned in a heat exchange relationship with exhaust gas from the internal combustion engine. A heat output area is in a further heat exchange relationship with a primary fuel as it is fed into the separator whereby the primary fuel is heated. In one embodiment a variable conductance heat pipe has a top operating temperature not greater than about 160 degrees Celsuis.

Pugachev et al, U.S. Pat. No. 5,327,874 discloses a fuel feed system for an internal combustion wherein a rich fuel-air mixture is fed as a main flow to decompose liquid fuel and convert it into a gas. A technical aim of the present invention consists in an increased fuel economy of the engine, reduced toxicity of exhaust gases, and use of a cheaper low-octane fuel. A method for preparing fuel-air mixture consists in mixing a heated, over rich fuel-air mixture with another flow of fuel-air mixture, by passing it through a promoter heated above the mixture ignition temperature, thus providing repeated contact of the flow with the promoter surface.

Stone, U.S. Pat. No. 6,557,535 discloses a system and method for transferring heat from the exhaust of an internal combustion engine to a fuel container storing compressed gas fuel, using a gaseous heat transfer medium. The heat transferred to the fuel container assists expansion and/or vaporization of the compressed gas fuel. The expanded and/or vaporized compressed gas fuel may be delivered to the internal combustion engine for use by the engine.

Covey, U.S. Pat. No. 5,291,870 discloses a system for providing an air-fuel vapor mixture to an engine for improving completeness of combustion and also reducing emissions. The system includes a vaporizer within which a series of baffles are disposed such that air and fuel pass along a tortuous passageway defined within the vaporizer. Exhaust gases provide heat to the vaporizer, and as air and fuel pass along the passageway of the vaporizer, a homogenous air-fuel vapor mixture is produced, with the homogenous mixture exiting the vaporizer being supplied to the engine by way of an adapter plate assembly. When used with a carburetor, the adapter plate is disposed between the carburetor and the engine.

Glass, U.S. Pat. No. 4,515,135 discloses a hot fuel gas generator for an internal combustion engine of the piston type that vaporizes liquid fuel such as gasoline and delivers the same to the engine through a control valve which is responsive in operation to accelerator linkage controlling the internal combustion engine's operation. The hot fuel gas generator uses exhaust gases as a heat source and communicates with an adaptor block mounted on the inlet manifold of the internal combustion engine. A conventional carburetor may be carried on the adaptor block along with a conventional air cleaner as known in the art. The hot fuel gas generator separately makes superheated steam from a controlled amount of water and mixes the steam with the gasified fuel in a mixing chamber which is enclosed in a hollow body member through which hot exhaust gases from the equipped internal combustion engine are directed prior to their delivery to an exhaust system.

Chu, U.S. Pat. No. 6,868,839 discloses a vaporized fuel injection system for a combustion engine that includes a fuel vaporization chamber and a two-way valve. The fuel vaporization chamber has a chamber input and a chamber output, and is connected with a fuel source via the chamber input. The fuel vaporization chamber is for vaporizing fuel input to the chamber input and outputting vaporized fuel to the chamber output. The two-way valve has first and second valve inputs and a valve output. The first valve input is connected to the chamber output, and the second valve input is connected to the fuel source. The two-way valve is switchable to allow fuel to flow from only one of the first or second valve inputs to the valve output.

The related art described above discloses fuel systems using heat from exhaust or coolant systems to vaporize fuel in order to improve engine operating efficiency and reduce unwanted components of exhaust gases. However, the prior art fails to disclose the present improved and novel system for maintaining operation during both cold starts and periods of excessive heat absorption. The present disclosure distinguishes over the prior art providing heretofore unknown advantages as described in the following summary and detailed description.

BRIEF SUMMARY OF THE INVENTION

This disclosure teaches certain benefits in construction and use which give rise to the objectives described below.

A vaporized fuel injection system for an internal combustion engine includes a hot fuel line that is positioned for thermal transfer with an exhaust pipe. A cold fuel line is positioned to avoid thermal transfer. The system further includes an expansion tank, and a vapor fuel injector. Both fuel lines provide liquid fuel via a fuel pump from a gas tank to the expansion tank. Fuel in the hot fuel line enters the expansion tank through an expansion valve and vaporizes due to the heat previously absorbed. A controller meters both heated fuel and non-heated fuel into the expansion tank to control fuel vapor below its spontaneous combustion temperature. Additionally, during cold starts or before exhaust heat is available for generating vapor, the cold fuel line delivers liquid fuel to the engine for conventional operation.

A primary objective inherent in the above described apparatus and method of use is to provide advantages not taught by the prior art.

Another objective is to achieve greater fuel mileage from an internal combustion engine over what can be realized using conventional methods.

A further objective is to improve the quality of exhaust gases from an internal combustion engine.

A still further objective is to provide alternative liquid and vapor fuel injection operation depending on the temperature of the fuel in fuel lines.

A yet still further objective is to provide cooling of vaporized fuel when such vapor is overheated.

Other features and advantages of the present invention will become apparent from the following more detailed description, taken in conjunction with the accompanying drawing, which illustrates, by way of example, the principles of the presently described apparatus and method of its use.

DETAILED DESCRIPTION OF THE INVENTION

Figure 1:
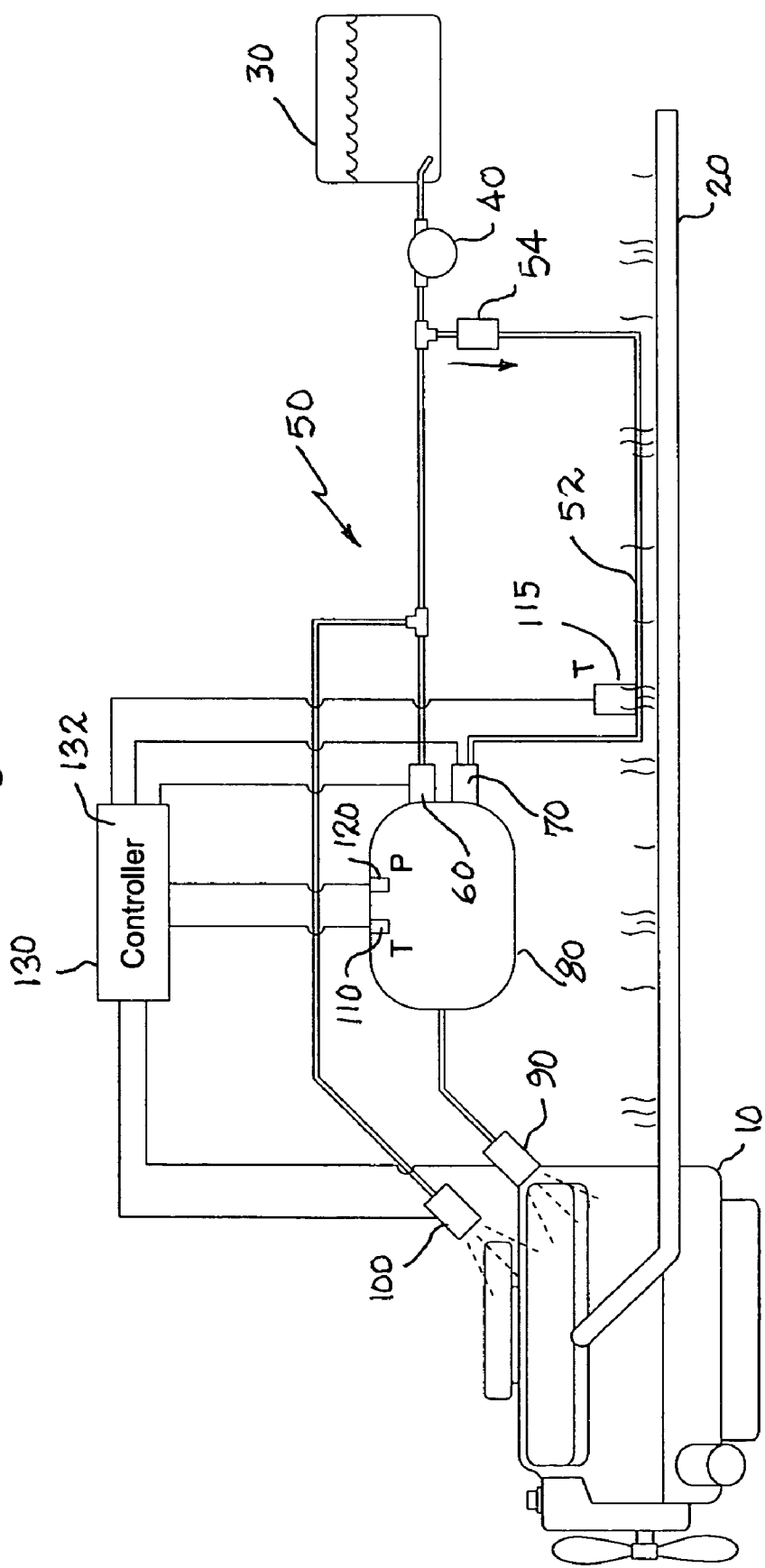
FIG. 1 is a diagram of an electronically controlled vaporized fuel injection system for an internal combustion engine according to an embodiment of the present invention.

The above described drawing figure illustrates the described apparatus and its method of use in at least one of its preferred, best mode embodiments, which is further defined in detail in the following description. Those having ordinary skill in the art may be able to make alterations and modifications to what is described herein without departing from its spirit and scope. Therefore, it should be understood that what is illustrated here is set forth only for the purpose of example and that it should not be taken as a limitation in the scope of the present apparatus and method of use.

The vapor and liquid fuel injection system of the present invention is similar to the apparatus of Chu, U.S. Pat. No. 6,868,839, described above. Therefore, the Chu reference is hereby incorporated herein by reference. As shown in FIG. 1, the present invention includes components as follows: an internal combustion engine 10, an engine exhaust system 20, a fuel tank 30; a fuel pump 40; a fuel line 50; a flow valve 54; a first expansion valve 60; a second expansion valve 70; an expansion tank 80; a vapor fuel injector 90; a liquid fuel injector 100; a temperature sensor 110, a pressure sensor 120, and a controller 130 providing signal processing means 132. The fuel line 50 provides fuel communication, i.e., flow, between the fuel tank 30 and fuel pump 40 as pump 40 is of the suction type and the outlet of pump 40 discharges into fuel line 50 pressurizing it. The fuel pump 40 may provide suction through a portion of the fuel line 50, as shown in FIG. 1, or the pump 40 may be included within the fuel tank 30 as is well known in the art. Therefore, pump 40 delivers fuel to each of expansion valves 60, 70 and fuel injectors 90, 100. Clearly, fuel line 50 may comprise several separate sections of conduit as shown. Flow valve 54 is a one-way control valve so that fuel is able to flow in the direction of the arrow in FIG. 1, but is prevented from reverse flow.

A portion of the fuel line 50, referred to herein as the "alpha portion" 52, is in thermal transfer proximity with at least a portion of the engine exhaust system 20 and this proximity may be by winding alpha portion 52 around the exhaust system 20, or by other mechanical and thermal joining. When fuel in portion 52 is heated and valve 70 is closed, the fuel may attempt to expand into other portions of the fuel line 50. Valve 54 prevents such back flow.

As shown also in FIG. 1, the expansion valves 60, 70 engage the expansion tank 80 so that they are able to deliver fuel into the expansion tank 80. Further, the injectors 90, 100 are engaged with the engine 10 as is well known in the art for delivering fuel directly into the cylinders of the engine. This function is shown schematically in FIG. 1 and with only one set of valves 60, 70, but one such set must be used for each engine cylinder for typical operation.

The temperature 110 and pressure 120 sensors are engaged with the expansion tank 80 so as to direct corresponding sensor signals to the controller 130 which is in signal communication with the sensors 110, 120. The controller 130 is also in signal communication with the expansion valves 60, 70, and the injectors 90, 100 whereby, the controller 130 meters fuel into the expansion tank 80 through the expansion valves 60, 70 thereby controlling a fuel vapor in the expansion tank 130 to a temperature set point, and whereby, the controller 130 meters fuel into the engine through the injectors 90, 100.

The above described system operates by directing fuel through the fuel line 50 from the fuel pump 40 to liquid fuel injector 100 when the engine 10 and exhaust system 20 are cold such as during initial startup. At this time, a low temperature of the fuel in the fuel line 50 is sensed by temperature sensor 115 so that the expansion valves 60 and 70 are maintained closed, and vapor injector 90 is not operated. The engine 10 is operated at this time conventionally with liquid fuel being injected into the engine's cylinders through injectors 100. When sensor 115 indicates that that the liquid fuel in alpha portion 52 has reached 400 degrees F., valve 70 is opened so that liquid fuel vaporizes into expansion tank 80, and injector 100 is controlled off while injector 90 starts operation, all controlled by controller 130. Engine 10 continues to operate on vaporized fuel through injector 90 until the engine 10 is shut down whereupon valve 70 and injector 90 are closed. When the engine 10 sits idle immediately after being shut down, the alpha portion 52 continues to receive heat from the exhaust system 20 so that the fuel therein may rise above its auto-ignition temperature of approximately 537 degrees F. However, combustion in portion 52 cannot occur since no oxygen is included therein. When the engine 10 is next started, sensor 115 may still indicate that the fuel in portion 52 is above 537 degrees and if that is the case, controller 130 opens valve 60 which allows liquid fuel to enter the expansion tank 80 to cool vapor entering through valve 70. sensor 110 enables the controller 130 to adjust the ratio of fuel throughput at valves 60 and 70 to maintain the temperature of vapor in the expansion tank below its auto-ignition temperature so that operation of the engine may continue in vapor mode.

During operation of the engine 10 the fuel in portion 52 may rise to a temperature above 500 degrees F. Should this occur, the controller 130 cools the vapor in the expansion tank 80 using liquid fuel through valve 60 as described above. In this manner, the temperature of vapor within tank 80 never rises above the auto-ignition temperature and operation of the engine 10 is maintained either with injected liquid fuel through injector 100 or with vaporized fuel through injector 90.

The mass of the fuel that is injected through injector 90 is controlled by controller 130 by sensing temperature and pressure at sensors 110 and 120 respectively in expansion tank 80 and adjusting the injection duration of injector 90 to maintain an appropriate mass flow rate.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A fuel delivery apparatus for an internal combustion engine having an engine exhaust system, the apparatus comprising components: a fuel tank; a fuel pump; a fuel line; a first expansion valve; a second expansion valve; an expansion tank; a vapor fuel injector; a liquid fuel injector; a temperature sensor, a pressure sensor, a controller providing signal processing means; the fuel line providing fuel communication between:
   (a) fuel tank and fuel pump;
   (b) fuel pump and first expansion valve;
   (c) fuel pump and second expansion valve within an alpha portion of the fuel line positioned in thermal communication with the engine exhaust system;
   (d) fuel pump and liquid fuel injector; and
   (e) expansion tank and vapor fuel injector;
the expansion valves and temperature and pressure sensors engaging the expansion tank; the injectors engaging the engine; the controller in signal communication with the sensors, the expansion valves, and the injectors;
whereby, the controller meters fuel into the expansion tank through the expansion valves thereby controlling a fuel vapor in the expansion tank to a temperature set point, and whereby, the controller meters fuel into the engine through the injectors.

2. A vapor and liquid fuel injection system comprising: components including: an internal combustion engine, an engine exhaust system, a fuel tank; a fuel pump; a fuel line; a first expansion valve; a second expansion valve; an expansion tank; a vapor fuel injector; a liquid fuel injector; a temperature sensor, a pressure sensor, a controller providing signal processing means; the fuel line providing fuel communication between:
- (f) fuel tank and fuel pump;
- (g) fuel pump and first expansion valve;
- (h) fuel pump and second expansion valve within an alpha portion of the fuel line positioned in thermal communication with the engine exhaust system;
- (i) fuel pump and liquid fuel injector; and
- (j) expansion tank and vapor fuel injector;

the expansion valves and temperature and pressure sensors engaging the expansion tank; the injectors engaging the engine; the controller in signal communication with the sensors, the expansion valves, and the injectors;

whereby, the controller meters fuel into the expansion tank through the expansion valves thereby controlling a fuel vapor in the expansion tank to a temperature set point, and whereby, the controller meters fuel into the engine through the injectors.

3. A fuel delivery method in an internal combustion engine having an engine exhaust system, a fuel tank; a fuel pump; a fuel line; a first expansion valve; a second expansion valve; an expansion tank; a vapor fuel injector; a liquid fuel injector; a temperature sensor, a pressure sensor, and a controller providing signal processing means; the method comprising the steps of:
- A. directing fuel through the fuel line between:
    - a) fuel tank and fuel pump;
    - b) fuel pump and first expansion valve;
    - c) fuel pump and second expansion valve within an alpha portion of the fuel line positioned in thermal communication with the engine exhaust system;
    - d) fuel pump and liquid fuel injector; and
    - e) expansion tank and vapor fuel injector;
- B. engaging:
    - a) expansion valves and temperature and pressure sensors with expansion tank;
    - b) injectors with engine; and
    - c) controller in signal communication with sensors, expansion valves, and injectors;
- C. metering fuel into the expansion tank through the expansion valves;
- D. controlling a fuel vapor in the expansion tank to a temperature set point by mixing liquid fuel with vapor; and
- E. metering liquid fuel into the engine when the exhaust system is cold; and
- F. metering vaporized fuel into the engine when the exhaust system is hot and the vapor is controlled to a set point.

* * * * *